(12) United States Patent
Duhon et al.

(10) Patent No.: US 7,714,180 B2
(45) Date of Patent: *May 11, 2010

(54) PROCESS AND APPARATUS FOR RECOVERING OLEFINS

(75) Inventors: David J Duhon, Kingwood, TX (US); John E Asplin, Singapore (SG)

(73) Assignee: ExxonMobil Chemical Patents Inc., Houston, TX (US)

( * ) Notice: Subject to any disclaimer, the term of this patent is extended or adjusted under 35 U.S.C. 154(b) by 377 days.

This patent is subject to a terminal disclaimer.

(21) Appl. No.: 11/893,432

(22) Filed: Aug. 16, 2007

(65) Prior Publication Data

US 2007/0284286 A1 Dec. 13, 2007

Related U.S. Application Data

(62) Division of application No. 10/407,727, filed on Apr. 4, 2003, now Pat. No. 7,273,542.

(51) Int. Cl.
*C07C 7/00* (2006.01)
*B01D 3/04* (2006.01)

(52) U.S. Cl. .................. 585/802; 196/111; 95/192; 95/208; 95/230; 95/237; 208/106; 208/340; 208/341; 422/211; 422/213

(58) Field of Classification Search .............. 585/800, 585/802; 196/111; 95/192, 96, 208, 230, 95/237; 62/630; 422/211, 213; 208/106, 208/340, 341

See application file for complete search history.

(56) References Cited

U.S. PATENT DOCUMENTS

| 2,500,353 | A | 3/1950 | Gantt |
| 2,780,580 | A | 2/1957 | Kniel |
| 2,849,371 | A | 8/1958 | Gilmore |
| 4,072,604 | A | 2/1978 | Ward |
| 4,150,962 | A | 4/1979 | Colton |
| 4,167,402 | A | 9/1979 | Davis |
| 4,509,967 | A | 4/1985 | Sweet |
| 4,743,282 | A | 5/1988 | Mehra |
| 4,832,718 | A | 5/1989 | Mehra |
| 5,019,143 | A | 5/1991 | Mehrta |
| 5,220,097 | A | 6/1993 | Lam et al. |
| 5,326,929 | A | 7/1994 | Mehra et al. |
| 5,444,176 | A | 8/1995 | Grenoble et al. |
| 5,462,583 | A | 10/1995 | Wood et al. |
| 5,521,264 | A | 5/1996 | Mehra et al. |
| 5,546,764 | A | 8/1996 | Mehra |
| 5,551,972 | A | 9/1996 | Wood et al. |
| 5,647,972 | A | 7/1997 | Kantorowicz et al. |
| 5,979,177 | A | 11/1999 | Sumner et al. |
| 5,981,818 | A * | 11/1999 | Purvis et al. ........... 585/519 |

(Continued)

FOREIGN PATENT DOCUMENTS

DE 1493377 3/1970

(Continued)

*Primary Examiner*—N. Bhat

(57) ABSTRACT

A process and apparatus for recovering product from reactor effluent of a reactor for a hydrocarbon feedstream is disclosed. An indigenous $C_4$ stream is used as lean oil in a demethanizer, which facilitates significant cost and operational savings. $C_4$ bottoms from a downstream depropanizer is used as lean oil recycle.

15 Claims, 1 Drawing Sheet

U.S. PATENT DOCUMENTS

| | | | |
|---|---|---|---|
| 6,077,985 A * | 6/2000 | Stork | 585/800 |
| 6,212,905 B1 | 4/2001 | Kuechler et al. | |
| 6,576,805 B2 * | 6/2003 | Keady et al. | 585/802 |

FOREIGN PATENT DOCUMENTS

| | | |
|---|---|---|
| GB | 1101982 | 2/1968 |
| SU | 1290045 | 2/1987 |
| SU | 1541236 | 2/1990 |

\* cited by examiner

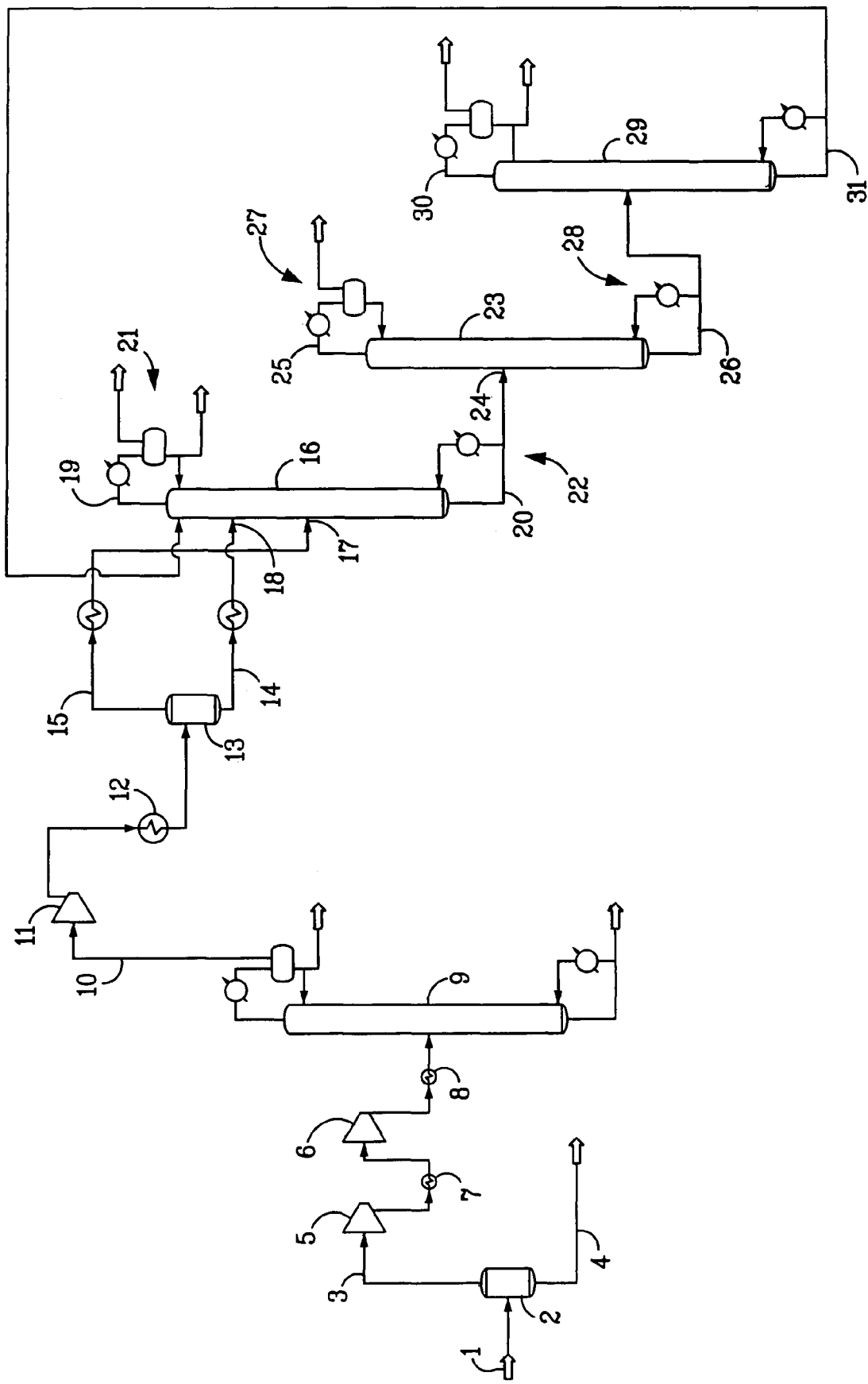

PROCESS AND APPARATUS FOR RECOVERING OLEFINS

CROSS REFERENCE TO RELATED APPLICATIONS

This application is a divisional of and claims benefit of U.S. application Ser. No. 10/407,727, filed Apr. 4, 2003, now U.S. Pat. No. 7,273,542, the entire contents of which are incorporated herein by reference.

BACKGROUND OF THE INVENTION

Olefins find widespread uses in many industries. For example, they represent the basic building blocks in such diverse uses as film and packaging, communications, construction, automotive and home appliances. These important materials are generally produced by the cracking of a hydrocarbon feedstream, which converts saturated hydrocarbons present in the feedstream into olefins.

Current cracking technologies for the production of light olefins (e.g. ethylene, propylene and, optionally, butylenes), gasoline and other cracked products such as light paraffins and naphtha can be classified into the two categories of thermal cracking (also known as steam cracking) and catalytic cracking. These technologies have been practiced for many years and are considered the workhorses for light-olefin production.

Steam or thermal cracking, a robust technology that does not utilize catalyst, produces the more valuable ethylene as the primary light olefin product. It is particularly suitable for cracking paraffinic feedstocks to a wide range of products including hydrogen, light olefins, light paraffins, and heavier liquid hydrocarbon products such as pyrolysis gasoline, steam cracked gas oil, etc. Conventional steam cracking utilizes a pyrolysis furnace, which has two main sections: a convection section and a radiant section reaction zone.

The hydrocarbon feed typically enters the convection section of the furnace as a liquid (except for light feeds which enter as a vapor) wherein it is typically heated and vaporized by indirect contact with hot flue gas from the radiant section and by mixing with steam. The vaporized feed and steam mixture is then introduced into the radiant section where the cracking takes place.

Current catalytic cracking technologies employ solid acid catalysts such as zeolites to promote cracking reactions. Unlike steam cracking technology, propylene is the primary light olefin product of catalytic cracking. Accordingly, catalytic cracking would be considered as the main source for growing propylene demand.

Cracked gases typically comprise hydrogen, carbon monoxide, carbon dioxide, methane, acetylene, ethylene, ethane, methyl acetylene, propadiene, propylene, propane, butadienes, butanes, butenes, $C_5$ hydrocarbons, $C_6$-$C_8$ hydrocarbons, non-aromatics, benzene, toluene and other heavy hydrocarbons. These gases including olefins leave the pyrolysis furnace for further downstream processing. It is necessary to separate the useful olefins, e.g., ethylene and propylene, from the rest of the product gases.

A widely practiced method for separating the product gases into various fractions involves compression, drying and fractional distillation. Typically, the product gases are compressed in multi-stage compression units wherein some heavier hydrocarbons and water are separated. The remaining product gases are then dried and chilled to separate lighter hydrocarbon fractions, e.g., ethylene and propylene, from heavier hydrocarbons. Chilling makes extensive use of ethylene and propylene refrigeration systems.

A major drawback related to the operation of the above-described olefin recovery plants relates to high-energy demands. Compression, ethylene refrigeration and propylene refrigeration are major contributors to this energy consumption.

Another method used in separating the product gases into various fractions involves the use of an absorber solvent to remove a target fraction from the remaining product gases. For example, in a demethanizer absorber, product gases containing methane typically flow upwardly within a tower in countercurrent contact with a downwardly flowing lean absorber solvent. The absorber solvent absorbs the methane from the remaining hydrocarbons in the product gases and typically exits the bottoms of the tower as (methane) rich absorber solvent. One drawback related to the use of such an absorber solvent system is that the rich absorber solvent typically contains a small, but valuable amount of desired product (e.g., ethylene) in addition to the unwanted methane. Huge expense and added operating costs can be incurred in downstream separation equipment required to separate the wanted (e.g., ethylene) products from the rich absorber solvent.

SUMMARY OF THE INVENTION

According to one aspect of the present invention a process comprises:
(i) reacting a hydrocarbon feedstream to produce a reactor effluent comprising $C_1$-$C_4^+$ hydrocarbons;
(ii) separating a $C_4$ hydrocarbon stream from the reactor effluent;
(iii) contacting a hydrocarbon fraction from the reactor effluent with an absorber medium in an absorber demethanizer wherein methane is separated from the hydrocarbon fraction; and
(iv) wherein at least a first portion of the absorber medium comprises the $C_4$ hydrocarbon stream that has been separated from the reactor effluent.

Preferably, the $C_4$ hydrocarbon stream is separated from the reactor effluent by separating the reactor effluent into a $C_4^-$ stream and a $C_5^+$ stream; and separating the $C_4^-$ stream into a $C_4$ stream and a $C_3^-$ stream. Also preferably, the $C_3^-$ stream comprises the hydrocarbon fraction from the reactor effluent that is contacted with absorber medium in the absorber demethanizer. In a preferred aspect of the present invention, the process is performed in the absence of ethylene refrigeration. In another preferred aspect, the hydrocarbon feedstream is reacted in a propylene catalytic cracker.

In a preferred aspect of the present invention, at least a second portion of the absorber medium comprises a $C_4$ hydrocarbon recycle stream from downstream processing. Preferably, the downstream processing comprises separation of the $C_4$ hydrocarbon from a hydrocarbon mixture.

According to another aspect of the invention, the reactor effluent is separated into the $C_4^-$ stream and the $C_5^+$ stream in a debutanizer. Preferably, the $C_4^-$ stream comprises an overhead stream from the debutanizer and the $C_5^+$ stream comprises a bottoms stream from the debutanizer.

According to a further aspect of the present invention, a $C_2$-$C_4$ stream exits the demethanizer and is fed to a deethanizer wherein $C_2$ hydrocarbon(s) are separated from the $C_2$-$C_4$ stream. Preferably, the $C_2$-$C_4$ stream exits as bottoms and the methane exits as overhead from the demethanizer.

In another aspect of the present invention, a $C_3$-$C_4$ stream exits the deethanizer and is fed to a depropanizer wherein $C_3$ hydrocarbon(s) are separated from the $C_3$-$C_4$ stream. Preferably, the $C_3$-$C_4$ stream exits as bottoms and the $C_3$ hydrocarbon(s) exit as overhead from the deethanizer.

In still another aspect of the present invention, $C_4$ hydrocarbon(s) are removed from the depropanizer as a stream that is recycled to the demethanizer as the at least second portion of the absorber medium.

According to another aspect of the present invention a process comprises:
(i) catalytically cracking a hydrocarbon feedstream to produce an olefinic reactor effluent;
(ii) fractionating the olefinic reactor effluent in a primary fractionator into a primary fractionator overhead stream and a primary fractionator bottoms stream;
(iii) feeding the primary fractionator overhead stream to a dubutanizer, wherein the overhead stream is separated into a $C_4^-$ overhead stream and a $C_5^+$ bottoms stream;
(iv) compressing and cooling the $C_4^-$ overhead stream;
(v) separating the compressed and cooled $C_4^-$ overhead stream into a $C_4$ stream and a $C_3^-$ stream;
(vi) feeding the $C_4$ stream to a first location of an absorber demethanizer;
(vii) feeding the $C_3^-$ stream to the absorber demethanizer at a $C_3^-$ stream feed location that is below the first location;
(viii) separating methane from the $C_3^-$ stream as overhead in the demethanizer;
(ix) removing a $C_2$-$C_4$ stream from the demethanizer as bottoms;
(x) feeding the $C_2$-$C_4$ stream from the demethanizer to a deethanizer, wherein the $C_2$-$C_4$ stream is separated into a $C_2$ overhead stream and a $C_3$-$C_4$ bottoms stream;
(xi) feeding the $C_3$-$C_4$ bottoms stream to a depropanizer, wherein the $C_3$-$C_4$ bottoms stream is separated into a $C_3$ overhead stream and a $C_4$ bottoms stream; and
(xii) feeding at least a portion of the $C_4$ bottoms stream to the absorber demethanizer at a location above the $C_3^-$ stream feed location.

In yet another aspect of the invention, apparatus comprises:
(i) a debutanizer comprising an upper debutanizer overhead outlet and a lower debutanizer bottoms outlet;
(ii) an absorber demethanizer downstream of the debutanizer and in fluid flow communication therewith through the debutanizer overhead outlet, the absorber demethanizer comprising an upper demethanizer overhead outlet, a lower demethanizer bottoms outlet, a liquid absorber medium inlet and a gaseous hydrocarbon inlet located below the absorber medium inlet;
(iii) a deethanizer downstream of the absorber demethanizer and having a feed inlet in fluid flow communication with the demethanizer bottoms outlet, the deethanizer comprising an upper deethanizer overhead outlet and a lower deethanizer bottoms outlet; and
(iv) a depropanizer downstream of the deethanizer and having a feed inlet in fluid flow communication with the deethanizer bottoms outlet, the depropanizer comprising an upper depropanizer overhead outlet and a lower depropanizer bottoms outlet, the depropanizer bottoms outlet being in fluid flow communication with the demethanizer through a liquid absorber medium inlet located above the demethanizer gaseous hydrocarbon inlet.

Preferably, the apparatus further comprises a compressor in fluid flow communication with the debutanizer overhead outlet, a heat exchanger in fluid flow communication with the compressor and a separator in fluid flow communication with the heat exchanger, the separator having a gaseous hydrocarbon outlet in fluid flow communication with the demethanizer gaseous hydrocarbon inlet and a liquid outlet in fluid flow communication with the demethanizer liquid absorber medium inlet.

BRIEF DESCRIPTION OF THE DRAWING

The FIGURE represents a schematic flow diagram providing a non-limiting illustration of a process and apparatus in accordance with the present invention.

DETAILED DESCRIPTION OF THE INVENTION

The particulars shown herein are by way of example and for purposes of illustrative discussion of the embodiments of the present invention only and are presented to provide what is believed to be the most useful and readily understood description of the principles and conceptual aspects of the present invention. In this regard, no attempt is made to show structural details of the present invention in more detail than is necessary for the fundamental understanding of the present invention, the description making apparent to those skilled in the art how the several forms of the present invention may be embodied in practice.

As is well known and within the skill of the art, when reference is made to a specific hydrocarbon stream, e.g., a $C_4$ stream, it is not practical or intended that such reference is strictly limited to a pure $C_4$ stream, since other components, albeit in small amounts, will also be present (e.g., $C_3$ will be present in a small amount in a stream designated as a $C_4$ stream). Accordingly, such reference is intended to include small amounts of other hydrocarbons.

With particular reference to the FIGURE, reference numeral 1 refers to a hydrocarbon feedstream from a reactor. As already indicated above, the reactor typically comprises a steam cracker or a catalytic cracker.

The hydrocarbons reacted in the reactor could comprise, by way of non-limiting example, hydrocarbonaceous oils boiling in the range of about 221° C. to about 566° C., such as gas oil, steam cracked gas oil and residues; heavy hydrocarbonaceous oils comprising materials boiling above 566° C.; heavy and reduced petroleum crude oil, petroleum atmospheric distillation bottoms, petroleum vacuum distillation bottoms, heating oil, pitch, asphalt, bitumen, other heavy hydrocarbon residues, tar sand oils, shale oil, liquid products derived from coal liquefaction processes, and mixtures therefore. Other non-limiting feedstreams could comprise steam heating oil, jet fuel, diesel, kerosene, gasoline, coker naphtha, steam cracked naphtha, catalytically cracked naphtha, hydrocrackate, reformate, raffinate reformate, Fischer-Tropsch liquids, Fischer-Tropsch gases, natural gasoline, distillate, virgin naphtha, $C_{5+}$ olefins (i.e., $C_5$ olefins and above), $C_{5+}$ paraffins, ethane, propane, butanes, butenes and butadiene, cat-cracked naphtha, coker naphtha, steam cracked gas oil, olefinic Fischer-Tropsch, virgin naphtha, natural gasoline, reformate and raffinate.

A propylene catalytic cracker using a fluidized bed (known within the art) is the preferred reactor. Naphtha is a preferred feedstock for treatment in the propylene catalytic cracker. As indicated above, the hydrocarbon feedstream 1 could typically comprise hydrogen, carbon monoxide, carbon dioxide, methane, acetylene, ethylene, ethane, methyl acetylene, propadiene, propylene, propane, butadienes, butanes, butenes, $C_5$ hydrocarbons, $C_6$-$C_8$ hydrocarbons, non-aromatics, benzene, toluene and other heavy hydrocarbons.

Reference numeral 2 refers to a primary fractionator to which feedstream 1 is fed for separation into, for example, a $C_6^+$ stream ($C_6$ hydrocarbons and higher) and a $C_5^-$ stream ($C_5$ hydrocarbons and lower). The $C_6^+$ stream exits the primary fractionator as liquid bottoms 4, and the $C_5^-$ stream exits primary fractionator 2 as gaseous overhead. As illustrated, the $C_5^-$ gaseous overhead stream 3 is compressed in series compressors 5 and 6, with intercooling in heat exchangers 7 and 8 before entering debutanizer 9. Debutanizer 9, preferably, is a distillation tower containing, for example, packing (e.g. raschig rings) or trays (e.g., bubble or sieve trays) to promote intimate contact between rising vapor and falling liquid within the debutanizer. The debutanizer separates the $C_5^-$ stream into a $C_4^-$ gaseous overhead stream 10 and a $C_5$ liquid bottoms stream.

Reference numeral 11 refers to a compressor for $C_4^-$ compression before cooling in heat exchanger 12. The compressed and cooled $C_4^-$ stream flows to vessel 13 wherein a $C_4$ stream 14 is separated from a $C_3^-$ stream 15. As shown, $C_3^-$ stream 15 is fed as a gas to absorber demethanizer 16 at a first location 17. $C_4$ stream 14 is fed to absorber demethanizer 16 at a second location 18 that is located above feed location 17 for the $C_3^-$ stream 15. At this point, the $C_4$ stream at feed location 18 comprises at least a first portion of the absorber medium (lean oil/solvent) for the absorber demethanizer. As will be more fully described below, in a preferred embodiment, $C_4$ stream 14 is combined with a recycle $C_4$ stream from the downstream depropanizer for use in the absorber demethanizer. Absorber demethanizer 16, preferably, is a distillation tower containing a contractor section located between the first inlet and the second inlet, wherein the $C_4$ stream contacts at least a portion of the first overhead stream within the contractor section. The contractor section may comprise, for example, packing (e.g. raschig rings) or trays (e.g., bubble or sieve trays) to promote intimate contact between rising vapor and falling liquid within the absorber demethanizer.

Within absorber demethanizer 16, the $C_4$ stream flows downwardly in countercurrent contact with upwardly flowing $C_3^-$ stream entering at feed location 17. The $C_4$ stream, acting as absorber medium, absorbs $C_2$ and $C_3$ hydrocarbons from the $C_3^-$. Thus, methane exits absorber demethanizer as overhead 19, and $C_2$-$C_4$ hydrocarbons exit as liquid bottoms 20. Bottoms stream 20 is fed to a deethanizer 23 at feed location 24. Well-known reflux and reboiler installations are schematically illustrated at 21 and 22, respectively, in the FIGURE.

The deethanizer, preferably, is a distillation tower containing, for example, packing (e.g. raschig rings) or trays (e.g., bubble or sieve trays). Within deethanizer 23, $C_2$ hydrocarbons are separated from $C_3$-$C_4$ hydrocarbons. The $C_2$ hydrocarbons exit tower 23 as overhead 25, and the $C_3$-$C_4$ hydrocarbons exit as bottoms 26. Well-known reflux and reboiler installations are generally indicated at 27 and 28 in the FIGURE. Bottoms stream 26 is fed to depropanizer 29. The depropanizer, preferably, is a distillation tower containing, for example, packing (e.g. raschig rings) or trays (e.g., bubble or sieve trays). Within depropanizer 29, $C_3$ hydrocarbons are separated from $C_4$ hydrocarbons. The $C_3$ hydrocarbons exit the depropanizer as overhead 30 and the $C_4$ hydrocarbons exit therefrom as bottoms 31. The $C_4$ bottoms 31 are then recycled, with compression, pumping and cooling (not shown) as necessary, to demethanizer 16 as the remaining portion of the absorber medium.

As will occur to those of ordinary skill in the art having the benefit of the above disclosure, in using processes and apparatus in accordance with the present invention, many advantages can be realized by practicing the various aspects and embodiments of the invention. For example, using the illustrated olefins recovery scheme permits the elimination of ethylene refrigeration and the reduction of propylene refrigeration. Also, significant steam savings (used, for example to drive ethylene refrigeration compressors), relative to existing technologies, can be realized. Further for example, placing the debutanizer first in the recovery scheme facilitates the use of an indigenous stream as lean oil (absorber medium). By using an indigenous hydrocarbon fraction as the absorber medium, loss of prime product (e.g., propylene) is reduced or minimized as compared to use of alternative absorption technologies, and potential for product contamination is significantly less than absorption technologies using non-indigenous lean oil.

One of ordinary skill in the art, having the benefit of the present disclosure, will appreciate that many modifications may be made to the various aspects and embodiments of the present invention as described herein without departing from the spirit of the present invention. Accordingly, the various aspects and embodiments described herein are illustrative only and are not intended to limit the scope of the present invention.

What is claimed is:

1. A process for removing methane from an olefinic reactor comprising:
   (i) cracking a hydrocarbon feedstream to produce an olefinic reactor effluent;
   (i) fractionating the olefinic reactor effluent into a first overhead stream and a first bottoms stream;
   (ii) feeding at least a portion of the first overhead stream to a first location of an absorber demethanizer;
   (iii) feeding a $C_4$ stream to the absorber demethanizer at a second location on the absorber demethanizer above the first location on the absorber demethanizer;
   (iv) separating methane from the at least a portion of the first overhead stream in the demethanizer; and
   (vi) removing a stream comprising $C_2$-$C_4$ hydrocarbons from the demethanizer as demethanizer bottoms;
   wherein at least a portion of the $C_4$ stream comprises $C_4$ hydrocarbons that were separated from the first overhead stream.

2. The process according to claim 1, further comprising:
   feeding the stream comprising $C_2$-$C_4$ hydrocarbons from the demethanizer to a deethanizer, wherein the stream comprising $C_2$-$C_4$ hydrocarbons is separated into a $C_2$ overhead stream and a $C_3$-$C_4$ bottoms stream.

3. The process according to claim 2, further comprising:
   feeding the $C_3$-$C_4$ bottoms stream to a depropanizer, wherein the $C_3$-$C_4$ bottoms stream is separated into a $C_3$ overhead stream and a $C_4$ bottoms stream.

4. The process according to claim 3, wherein the $C_4$ bottoms stream is fed to the absorber demethanizer at a location above the first location on the absorber demethanizer.

5. An apparatus comprising:
   (i) a debutanizer comprising an upper debutanizer overhead outlet and a lower debutanizer bottoms outlet;
   (ii) an absorber demethanizer downstream of the debutanizer and in fluid flow communication therewith through the debutanizer overhead outlet, the absorber demethanizer comprising (a) an upper demethanizer overhead outlet, (b) a lower demethanizer bottoms outlet, (c) at least one liquid absorber medium inlet, and (d) a gaseous hydrocarbon inlet located below at least one absorber medium inlet;
   (iii) a deethanizer downstream of the absorber demethanizer and having a feed inlet in fluid flow communication with the demethanizer bottoms outlet, the deethanizer comprising an upper deethanizer overhead outlet and a lower deethanizer bottoms outlet; and (iv) a depropanizer downstream of the deethanizer and having a feed inlet in fluid flow communication with the deethanizer bottoms outlet, the depropanizer comprising an upper depropanizer overhead outlet and a lower depropanizer bottoms outlet, the depropanizer bottoms outlet being in fluid flow communication with the demethanizer through at least one liquid absorber medium inlet located above the demethanizer gaseous hydrocarbon inlet.

6. The apparatus of claim 5, further comprising:

a compressor in fluid flow communication with the debutanizer overhead outlet;

a heat exchanger in fluid flow communication with the compressor; and a separator in fluid flow communication with the heat exchanger, the separator having a gaseous hydrocarbon outlet in fluid flow communication with the demethanizer gaseous hydrocarbon inlet and a liquid outlet in fluid flow communication with the demethanizer liquid absorber medium inlet.

7. An apparatus for recovering hydrocarbon fractions from an olefinic reactor comprising:

(i) an olefinic reactor for cracking a hydrocarbon feedstream to produce an olefinic reactor effluent;

(ii) a fractionator to fractionate the olefinic reactor effluent into a first overhead stream and a first bottoms stream;

(iii) an absorber demethanizer for receiving at least a portion of the first overhead stream at a first inlet in the absorber demethanizer;

(iv) a second inlet in the absorber demethanizer located above the first inlet for introducing a $C_4$ feed stream into the absorber demethanizer at the second location on the absorber demethanizer above the first location on the absorber demethanizer, the $C_4$ stream contacting the at least a portion of the first overhead stream within the absorbent demethanizer;

(v) a demethanizer overhead outlet for removing a separated methane stream from within the absorber demethanizer; and (vi) a demethanizer bottoms outlet for removing a stream comprising $C_2$-$C_4$ hydrocarbons from the absorber demethanizer as demethanizer bottoms.

8. The apparatus of claim 7, further comprising:

a $C_4$ recycle line for conducting a recovered $C_4$ fraction of the $C_2$-$C_4$ demethanizer bottoms stream to the second inlet in the absorber demethanizer, and the $C_4$ feed stream comprises the recovered $C_4$ fraction.

9. The apparatus of claim 8, further comprising:

a deethanizer in fluid communication with the demethanizer bottoms outlet.

10. The apparatus of claim 8, further comprising:

a depropanizer in fluid communication with the demethanizer bottoms outlet.

11. The apparatus of claim 9, further comprising:

a depropanizer in fluid communication with the deethanizer.

12. The apparatus of claim 7, wherein the absorber demethanizer comprises:

a distillation tower including a contactor section located between the first inlet and the second inlet, wherein the $C_4$ stream contacts the at least a portion of the first overhead stream within the contactor section of the absorbent demethanizer.

13. The apparatus of claim 12, wherein the contactor section comprises at least one of packing, trays, and channels.

14. The apparatus of claim 7, further comprising:

a primary fractionator for fractionating the olefinic reactor effluent into a light olefin stream comprising $C_5^-$ hydrocarbons, the light olefin stream in fluid communication with the demethanizer.

15. The apparatus of claim 7, further comprising:

a debutanizer in fluid communication with the demethanizer.

* * * * *